(12) United States Patent
Hirata et al.

(10) Patent No.: US 8,854,320 B2
(45) Date of Patent: Oct. 7, 2014

(54) MOBILE TYPE IMAGE DISPLAY DEVICE, METHOD FOR CONTROLLING THE SAME AND INFORMATION MEMORY MEDIUM

(75) Inventors: Shinichi Hirata, Kanagawa (JP); Hiroshi Osawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 346 days.

(21) Appl. No.: 13/003,751

(22) PCT Filed: Mar. 25, 2009

(86) PCT No.: PCT/JP2009/056004
§ 371 (c)(1),
(2), (4) Date: Apr. 7, 2011

(87) PCT Pub. No.: WO2010/007813
PCT Pub. Date: Jan. 21, 2010

(65) Prior Publication Data
US 2011/0187660 A1    Aug. 4, 2011

(30) Foreign Application Priority Data

Jul. 16, 2008 (JP) ................................ 2008-184858
Jul. 16, 2008 (JP) ................................ 2008-184859

(51) Int. Cl.
*G06F 3/041* (2006.01)
*G06F 3/0488* (2013.01)
*G06F 3/0354* (2013.01)

(52) U.S. Cl.
CPC .. *G06F 3/04883* (2013.01); *G06F 2203/04808* (2013.01); *G06F 3/03547* (2013.01); *G06F 2203/0339* (2013.01)

USPC .......................................................... 345/173

(58) Field of Classification Search
USPC .................................. 345/173–178; 348/333
See application file for complete search history.

(56) References Cited

U.S. PATENT DOCUMENTS 5,729,249 A * 3/1998 Yasutake ........................ 345/173
6,297,838 B1 * 10/2001 Chang et al. ................... 715/863
(Continued)

FOREIGN PATENT DOCUMENTS

JP    2000-293120 A    10/2000
JP    2001-290585 A    10/2001
(Continued)

OTHER PUBLICATIONS

Patent Cooperation Treaty; "International Preliminary Report on Patentability" issued in corresponding PCT/ JP2009/056004; dated Feb. 8, 2011; 14 pages.

(Continued)

*Primary Examiner* — Robin Mishler
(74) *Attorney, Agent, or Firm* — Fitch, Even, Tabin & Flannery, LLP (57) ABSTRACT

Provide is a portable image display device which allows a user to perform many different operation inputs with ease. The portable image display device includes: a display screen having a substantially rectangular shape; and a plurality of touch sensors provided along at least two sides defining a circumference of the display screen, for each detecting a position touched by a finger of a user. The portable image display device changes an image displayed on the display screen in accordance with a combination of the positions of a plurality of the fingers which are respectively detected by the plurality of touch sensors.

6 Claims, 7 Drawing Sheets

(56) References Cited

U.S. PATENT DOCUMENTS

| | | | |
|---|---|---|---|
| 2002/0036618 A1 | 3/2002 | Wakai et al. | |
| 2002/0176016 A1 | 11/2002 | Misawa et al. | |
| 2003/0142081 A1* | 7/2003 | Iizuka et al. | 345/173 |
| 2005/0012723 A1* | 1/2005 | Pallakoff | 345/173 |
| 2005/0083313 A1* | 4/2005 | Hardie-Bick | 345/177 |
| 2007/0103452 A1 | 5/2007 | Wakai et al. | |
| 2007/0202956 A1 | 8/2007 | Ogasawara et al. | |

FOREIGN PATENT DOCUMENTS

| | | | |
|---|---|---|---|
| JP | 2002-354311 A | 12/2002 | |
| JP | 2003-186426 A | 7/2003 | |
| JP | 2003-216300 A | 7/2003 | |
| JP | 2004-206206 A | 7/2004 | |
| JP | 2004-213451 A | 7/2004 | |
| JP | 2004-213558 A | 7/2004 | |
| JP | 2005-156850 A | 6/2005 | |
| JP | 2005-316656 A | 11/2005 | |
| JP | 2005-322087 A | 11/2005 | |
| JP | 2006-039107 A | 2/2006 | |
| JP | 2006-79499 A | 3/2006 | |
| JP | 2007-94708 A | 4/2007 | |
| JP | 2007-114584 A | 5/2007 | |
| JP | 2007-207275 A | 8/2007 | |
| JP | 2007-220109 A | 8/2007 | |
| JP | 2009-99067 A | 5/2009 | |
| WO | 2006096501 A1 | 9/2006 | |

OTHER PUBLICATIONS

Japanese Patent Office; "Office Action" issued in corresponding Japanese Patent Application No. 2008-184858, dated Sep. 18, 2012, 6 pages. (includes partial English translation).

Japanese Patent Office; "International Search Report" issued in corresponding International Application No. PCT/JP2009/056004; Date of Mailing Jun. 23, 2009; 9 pages total, which includes 5 pages of English-language translation.

Japanese Patent Office; "Office Action" issued in corresponding Japanese Patent Application No. 2008-184859, dated Jan. 29, 2013, 5 pages (includes partial English translation).

Japanese Patent Office; "Office Action" issued in corresponding Japanese Patent Application No. 2008-184859, dated Jun. 11, 2013, 5 pages (includes partial English translation).

* cited by examiner

MOBILE TYPE IMAGE DISPLAY DEVICE, METHOD FOR CONTROLLING THE SAME AND INFORMATION MEMORY MEDIUM

TECHNICAL FIELD

The present invention relates to a portable image display device which is carried around and used by a user, a control method therefor, and an information storage medium.

BACKGROUND ART

In recent years, various image display devices such as a portable game machine, a mobile phone, and a personal digital assistant (PDA), which can be carried around and used by a user and include a display screen for presenting the user with various kinds of information, have appeared in the market (see, for example, Patent Document 1). Such a portable image display device executes various kinds of information processing according to the user's operation input and displays results thereof on the display screen. Patent Document 1: US 2007/0202956 A1

DISCLOSURE OF THE INVENTION

Problems to be Solved by the Invention

It is desired that such a portable image display device as described above be provided with a user interface that allows a user to perform many different operation inputs with ease.

Further, in order to allow such a portable image display device as described above to present the user with information in many different ways, the inventors of the subject application have studied providing display screens to the portable image display device on both of front and back surfaces thereof. In this case, various manners of handling the portable image display device are expected when the user holds the portable image display device with the hand to view both the display screens. Therefore, it is necessary to display an image on the display screen in consideration of how the user handles the portable image display device.

The present invention has been made in view of the above-mentioned circumstances, and an object thereof is to provide a portable image display device which allows a user to perform many different operation inputs with ease, a control method therefor, and an information storage medium.

Further, another object of the present invention is to provide a portable image display device which can display an image on a display screen in a mode that corresponds to how a user handles the portable image display device when being provided with display screens on both of front and back surfaces thereof, and also provide a control method therefor, and an information storage medium.

Means for Solving the Problems

A portable image display device according to one aspect of the present invention includes: a display screen having a substantially rectangular shape; a plurality of touch sensors provided along at least two sides defining a circumference of the display screen, for each detecting a position touched by a finger of a user; and display image control means for changing an image displayed on the display screen in accordance with a combination of the positions of a plurality of the fingers which are respectively detected by the plurality of touch sensors.

Further, in the portable image display device, the display image control means may change the image displayed on the display screen in accordance with a combination of movements of the respective positions of the plurality of the fingers which are detected by the plurality of touch sensors.

Further, in the portable image display device, the display image control means may change the image displayed on the display screen in accordance with a combination of directions of the movements of the respective positions of the plurality of the fingers which are detected by the plurality of touch sensors.

Further the portable image display device may further include a plate-like casing having a substantially rectangular shape. The display screen may be provided to a front surface of the plate-like casing, and each of the plurality of touch sensors may be provided to a side surface of the plate-like casing.

Further, according to one aspect of the present invention, there is provided a control method for a portable image display device including: a display screen having a substantially rectangular shape; and a plurality of touch sensors provided along at least two sides defining a circumference of the display screen, for each detecting a position touched by a finger of a user, the control method including changing an image displayed on the display screen in accordance with a combination of the positions of a plurality of the fingers which are respectively detected by the plurality of touch sensors.

Further, according to one aspect of the present invention, there is provided a computer-readable information storage medium, which stores a program for controlling a computer to function as a portable image display device including: a display screen having a substantially rectangular shape; and a plurality of touch sensors provided along at least two sides defining a circumference of the display screen, for each detecting a position touched by a finger of a user, the program controlling the computer to function as display image control means for changing an image displayed on the display screen in accordance with a combination of the positions of a plurality of the fingers which are respectively detected by the plurality of touch sensors.

Further, a portable image display device according to another aspect of the present invention includes: a first display screen provided to a front surface of a plate-like casing; a second display screen provided to a surface of the plate-like casing opposite to the first display screen; state identifying means for identifying each of a first state in which the first display screen is directed to a user and a second state in which the second display screen is directed to the user; and display image control means for changing an image displayed on one of the first display screen and the second display screen directed to the user in accordance with a mode of a posture change of the plate-like casing obtained when a transition occurs from one of the first state and the second state to another one of the first state and the second state.

Further, in the portable image display device, the display image control means may change an orientation of the image displayed on the one of the first display screen and the second display screen directed to the user with respect to the plate-like casing in a state after the transition in accordance with the mode of the posture change.

Further, in the portable image display device, the display image control means may change the orientation of the image displayed on the one of the first display screen and the second display screen directed to the user with respect to the plate-like casing in the state after the transition in accordance with a direction of a rotational axis of rotation in terms of the plate-like casing obtained when the transition occurs by the rotation of the plate-like casing.

Further, in the portable image display device, the display image control means may change, when the transition occurs, the image displayed on the one of the first display screen and the second display screen directed to the user in a state before the transition in accordance with the mode of the posture change.

Further, in the portable image display device, the plate-like casing may have a substantially rectangular shape, and the plate-like casing may have side surfaces provided with a plurality of touch sensors for each detecting a position touched by a finger of the user.

Further, according to another aspect of the present invention, there is provided a control method for a portable image display device including: a first display screen provided to a front surface of a plate-like casing; and a second display screen provided to a surface of the plate-like casing opposite to the first display screen, the control method including: identifying each of a first state in which the first display screen is directed to a user and a second state in which the second display screen is directed to the user; and changing an image displayed on one of the first display screen and the second display screen directed to the user in accordance with a mode of a posture change of the plate-like casing obtained when a transition occurs from one of the first state and the second state to another one of the first state and the second state.

Further, according to another aspect of the present invention, there is provided a computer-readable information storage medium, which stores a program for controlling a computer to function as a portable image display device including: a first display screen provided to a front surface of a plate-like casing; and a second display screen provided to a surface of the plate-like casing opposite to the first display screen, the program controlling the computer to function as: state identifying means for identifying each of a first state in which the first display screen is directed to a user and a second state in which the second display screen is directed to the user; and display image control means for changing an image displayed on one of the first display screen and the second display screen directed to the user in accordance with a mode of a posture change of the plate-like casing obtained when a transition occurs from one of the first state and the second state to another one of the first state and the second state.

BEST MODE FOR CARRYING OUT THE INVENTION

Hereinafter, embodiments of the present invention are described in detail with reference to the drawings.

First Embodiment

Figure 1A:
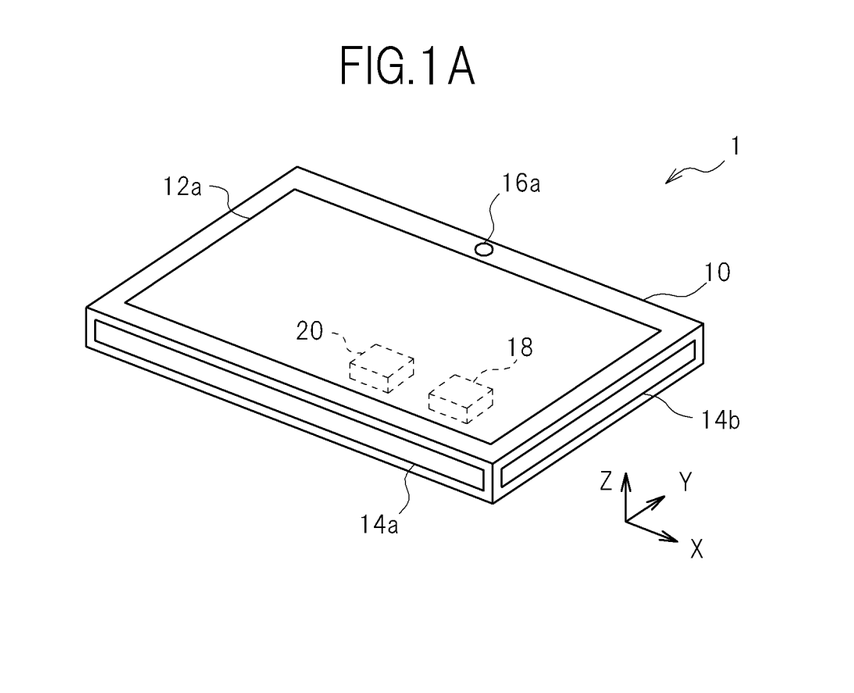
FIG. 1A A perspective view illustrating an external appearance of a portable image display device on a front surface side thereof according to embodiments of the present invention.
Figure 1B:
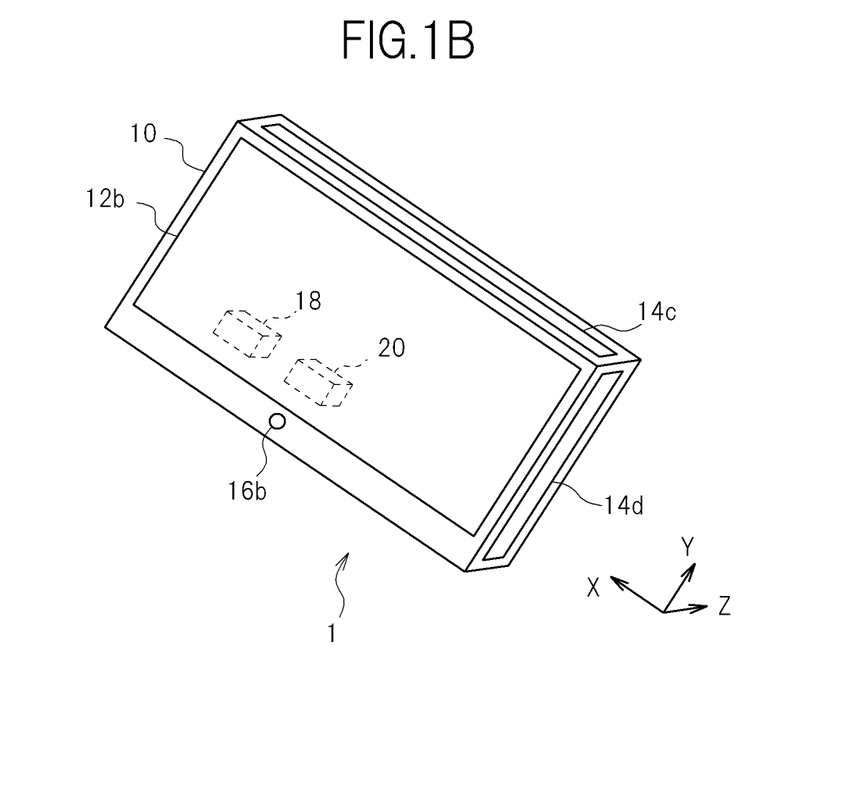
FIG. 1B A perspective view illustrating an external appearance of the portable image display device on a back surface side thereof according to the embodiments of the present invention.

FIG. 1A and FIG. 1B are perspective views illustrating external appearances of a portable image display device 1 according to a first embodiment of the present invention. FIG. 1A and FIG. 1B illustrate how the portable image display device 1 appears when viewed from a front surface (front) side thereof and how the same portable image display device 1 appears when viewed from a back surface side thereof, respectively.

As illustrated in those figures, a casing 10 of the portable image display device 1 is shaped like a plate and has a substantially rectangular shape as a whole, and is provided with a first display screen 12a and a second display screen 12b on a front surface thereof and a back surface thereof, respectively. Those display screens each have a substantially rectangular shape, and are each arranged so as to occupy a large part of the front surface or the back surface of the casing 10. The first display screen 12a and the second display screen 12b may be any kind of device that can display an image, such as a liquid crystal display panel or an organic EL display panel. Further, a touch panel that can detect a position touched by the user may be overlaid on each of those display screens.

In addition, the portable image display device 1 according to this embodiment is provided with four touch sensors arranged along respective four sides that define a circumference of the display screen. Those touch sensors are arranged on four respective side surfaces of the casing 10, and each include a detection region having a straight-line shape. By being thus arranged on the side surfaces of the casing 10, the touch sensors are each arranged along both of a side of the circumference of the first display screen 12a arranged on the front surface of the casing 10 and a side of the circumference of the second display screen 12b arranged on the back surface.

Specifically, in this embodiment, a first touch sensor 14a and a third touch sensor 14c are arranged on the side surfaces along a long-side direction (left-and-right direction) of the first display screen 12a and the second display screen 12b, and a second touch sensor 14b and a fourth touch sensor 14d are arranged on the side surfaces along a short-side direction (up-and-down direction) of the first display screen 12a and the second display screen 12b.

Those touch sensors are used for detecting a position touched by a finger of the user who uses the portable image display device 1. The respective touch sensors may be of any kind of system such as an electrostatic capacity system, a pressure sensitive system, or an optical system. Further, the respective touch sensors may be configured to detect an intensity with which the finger of the user depresses the touch sensor by detecting not only the position touched by the finger of the user but also, for example, a contact area or a pressure of the finger. When those touch sensors detect the position of the finger of the user, the portable image display device 1 can receive, as an operation input, the position of the finger of the user in directions along the circumferences of the first display screen 12a and the second display screen 12b.

Further, a first far-infrared sensor 16a is provided to the front surface of the casing 10 adjacently to the first display screen 12a. In addition, a second far-infrared sensor 16b is provided to the back surface of the casing 10 adjacently to the second display screen 12b. Those far-infrared sensors detect a far infrared ray emitted from a heat source. This allows the portable image display device 1 to detect whether or not there is a user in front of the respective far-infrared sensors. Note that, in place of the far-infrared sensors or in addition thereto, the portable image display device 1 may be provided with any kind of device that can detect the position of the user, such as a CCD camera.

Further, an acceleration sensor 18 and a gyroscope 20 are arranged in an internal portion of the casing 10 of the portable image display device 1. The acceleration sensor 18 is a three-axis acceleration sensor, and detects an acceleration caused in each of directions of three reference axes (X-axis, Y-axis, and Z-axis) set in terms of the casing 10. Here, the three reference axes are substantially orthogonal to one another with the X-axis, the Y-axis, and the Z-axis being set to the long-side direction of the rectangular shape of the front surface of the casing 10, the short-side direction of the rectangular shape, and a thickness direction of the casing 10, respectively. When the acceleration sensor 18 detects the acceleration caused in the respective reference axes due to gravity, the portable image display device 1 can detect its own posture (that is, inclination of the casing 10 to a vertical direction in which gravity acts).

The gyroscope 20 detects an angular velocity of rotation made about a gyro reference axis (here, Z-axis), and outputs an electrical signal corresponding to the detected angular velocity. Examples of the gyroscope 20 include a piezoelectric vibration type gyro. By integrating the angular velocity detected by the gyroscope 20, the portable image display device 1 can calculate a rotation angle of the casing 10 relative to the Z-axis.

Note that, although not illustrated in FIG. 1A or FIG. 1B, the portable image display device 1 may include various operation members for receiving the user's operation inputs, such as buttons and switches, on the front surface, the back surface, the side surfaces, and the like of the casing 10 in addition to the touch sensors.

Figure 2:
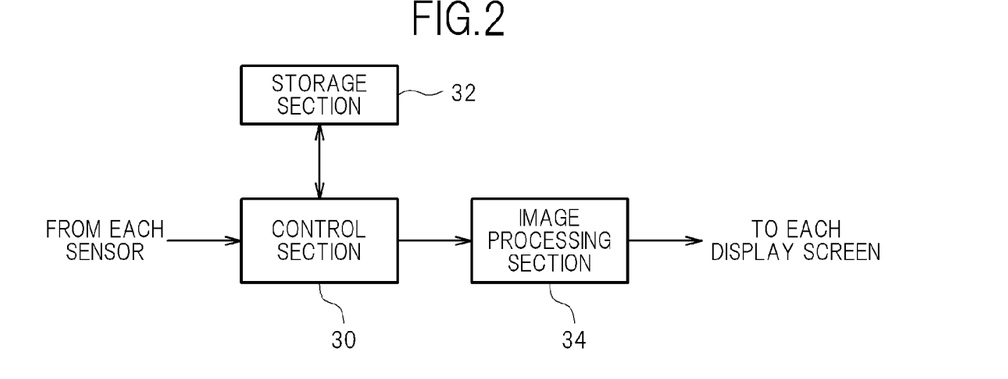
FIG. 2 A block diagram illustrating an internal configuration of the portable image display device according to the embodiments of the present invention.

FIG. 2 is a configuration block diagram illustrating an internal configuration of the portable image display device 1. As illustrated in the figure, the portable image display device 1 includes a control section 30, a storage section 32, and an image processing section 34. The control section 30 is, for example, a CPU, and executes various kinds of information processing according to a program stored in the storage section 32. The storage section 32 is, for example, a memory element such as a RAM or a ROM or a disk device, and stores the program executed by the control section 30 and various kinds of data. Further, the storage section 32 also functions as a work memory of the control section 30.

The image processing section 34 includes, for example, a GPU and a frame buffer memory, and draws images to be respectively displayed on the first display screen 12a and the second display screen 12b according to an instruction output by the control section 30. As a specific example, the image processing section 34 includes two frame buffer memories respectively corresponding to the first display screen 12a and the second display screen 12b, and the GPU respectively writes images to the two frame buffer memories at predetermined time intervals according to the instruction from the control section 30. Then, the images written to those frame buffer memories are converted into video signals at a predetermined timing, and respectively displayed on the display screens corresponding thereto.

In this embodiment, the control section 30 executes various kinds of processing based on detection results obtained respectively through the touch sensors 14a to 14d, the far-infrared sensors 16a and 16b, the acceleration sensor 18, and the gyroscope 20 and other such information. In particular, the control section 30 judges contents of the user's instruction operation based on the detection results for the position of the finger of the user obtained through the touch sensors 14a to 14d, executes processing corresponding to the instruction operation, and presents the user with the processing results by displaying the processing results on the display screen.

Here, the display screen viewed by the user changes between the first display screen 12a and the second display screen 12b depending on the case. Therefore, the portable image display device 1 identifies the display screen assumed to be mainly viewed by the user (hereinafter, referred to as "main display screen"), and displays the image to be displayed mainly on the main display screen. Further, the portable image display device 1 may display supplementary information related to the image displayed on the main display screen on a display screen on the opposite side to the main display screen (hereinafter, referred to as "sub display screen"), or may display another image generated by another program different from the program for generating the image to be displayed on the main display screen. Further, the sub display screen may keep an image from being displayed thereon until the sub display screen is switched over to the main display screen by the user's operation or the like.

Note that, a switchover regarding which of the first display screen 12a and the second display screen 12b is to be set as the main display screen may be performed based on information indicating which side of the casing 10 the user exists on, which is detected by the first far-infrared sensor 16a and the second far-infrared sensor 16b, the posture of the casing 10 detected by the acceleration sensor 18, and other such information. Alternatively, the switchover may be performed according to the user's explicit instruction operation.

Figure 3:
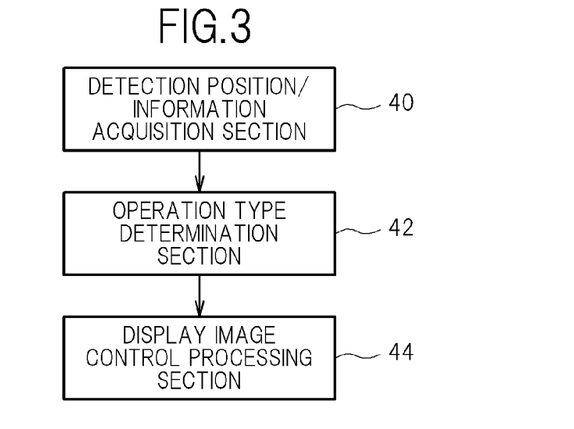
FIG. 3 A functional block diagram illustrating a functional example of a portable image display device according to a first embodiment.

Hereinafter, a specific example of the processing executed by the control section 30 according to the detection results obtained through the respective touch sensors in this embodiment is described. In this embodiment, the control section 30 executes processing for changing the image to be displayed on the main display screen in accordance with a combination of a plurality of positions of the fingers of the user detected by the touch sensors 14a to 14d. In order to execute such processing, as illustrated in FIG. 3, the portable image display device 1 functionally includes a detection position/information acquisition section 40, an operation type determination section 42, and a display image control processing section 44. Those functions are implemented by the control section 30 executing a program stored in the storage section 32. The program may be provided by being stored in any kind of computer-readable information storage medium such as an optical disk or a memory card, or may be provided via a communication network such as the Internet.

The detection position/information acquisition section 40 acquires coordinate values output by the touch sensors 14a to 14d that have detected the positions of fingers of the user. In this embodiment, in the case of detecting the position touched by the finger of the user, each of the touch sensors 14a to 14d outputs the coordinate value indicating the position at predetermined time intervals. Note that, here, the coordinate value output by each touch sensor is set as a one-dimensional value indicating a position within the detection region having a straight-line shape. The detection position/information acquisition section 40 acquires the coordinate values respectively output by the four touch sensors at predetermined time intervals. This produces four coordinate value sequences at maximum, which indicate positional movements (changes over time) of the fingers of the user, corresponding to the four touch sensors. Further, the detection position/information acquisition section 40 may acquire not only the coordinate value indicating the detection position but also a pressure value indicating an intensity with which the user depresses the position. In this case, the detection position/information acquisition section 40 may adopt only a coordinate value with which the pressure value is equal to or larger than a predetermined threshold value, as the coordinate value indicating the position touched by the finger of the user.

The operation type determination section 42 determines the type of operation executed by the user based on a plurality of coordinate value sequences indicating the positional movements of the fingers of the user which are acquired by the detection position/information acquisition section 40. For example, the operation type determination section 42 first determines, for each of the four touch sensors, whether or not the finger of the user has kept touching the touch sensor over a predetermined period and the finger of the user has moved by a predetermined amount or larger within the period. Then, if there are a plurality of touch sensors for which it is determined that the finger of the user has moved by an amount equal to or larger than the predetermined amount, the type of the operation performed by the user is determined based on the combination of those touch sensors and the directions of the movements of the fingers of the user (that is, whether the coordinate values have increased or decreased within the coordinate value sequences). This allows the determination of the operation type to be performed in accordance with the combination of the respective movements (here, moving directions) of the fingers of the user which are detected by the plurality of touch sensors.

The display image control processing section 44 changes the image to be displayed on the main display screen in accordance with the operation type determined by the operation type determination section 42. Specifically, for example, the display image control processing section 44 executes image processing of enlarging or reducing the image displayed on the screen or scrolling (moving in parallel) the image in a left/right/up/down direction.

Hereinafter, FIG. 4 to FIG. 9 are referenced to describe specific examples of the change in the image corresponding to the type of user operation. Note that, those figures schematically illustrate the first display screen 12a as the main display screen and the respective touch sensors, which are actually arranged on the side surfaces of the casing 10 along the four sides that define the circumference thereof, in alignment with the respective sides of the first display screen 12a. Further, the movement of the finger of the user is indicated by the arrow on each of the touch sensors.

Figure 4:
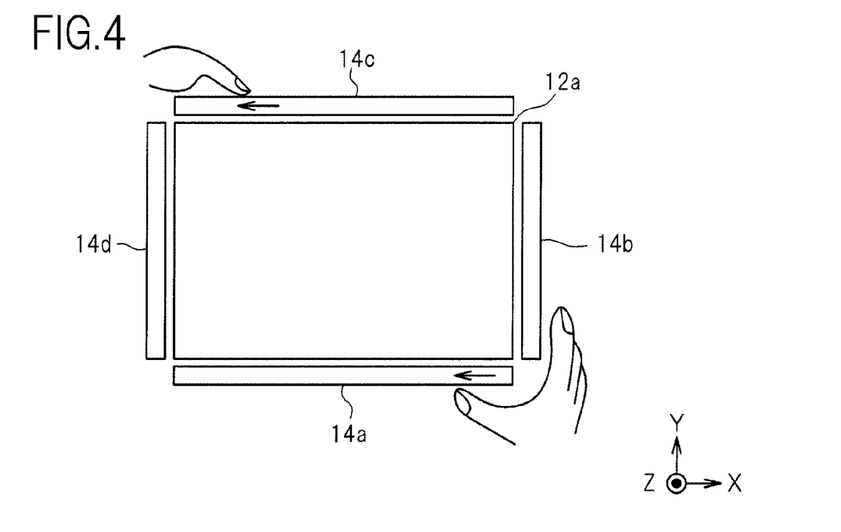
FIG. 4 An explanatory diagram illustrating an example of an operation performed by a user with respect to touch sensors.

FIG. 4 illustrates an example in which the control section 30 scrolls the image displayed on the first display screen 12a in the left-and-right direction according to the user's operation. In the example of this figure, the first touch sensor 14a and the third touch sensor 14c, which are arranged along the left-and-right direction of the display screen, both detect the movements of the fingers of the user moving in a leftward direction (that is, negative X-axis direction) when viewed facing the display screen. In this case, the control section 30 executes the processing for scrolling the image displayed on the first display screen 12a in the leftward direction which is the direction in which the finger of the user moves. In contrast, if the first touch sensor 14a and the third touch sensor 14c detect the movements of the fingers of the user in a rightward direction (that is, positive X-axis direction) when viewed facing the display screen, the control section 30 scrolls the image displayed on the first display screen 12a in the rightward direction.

Figure 5:
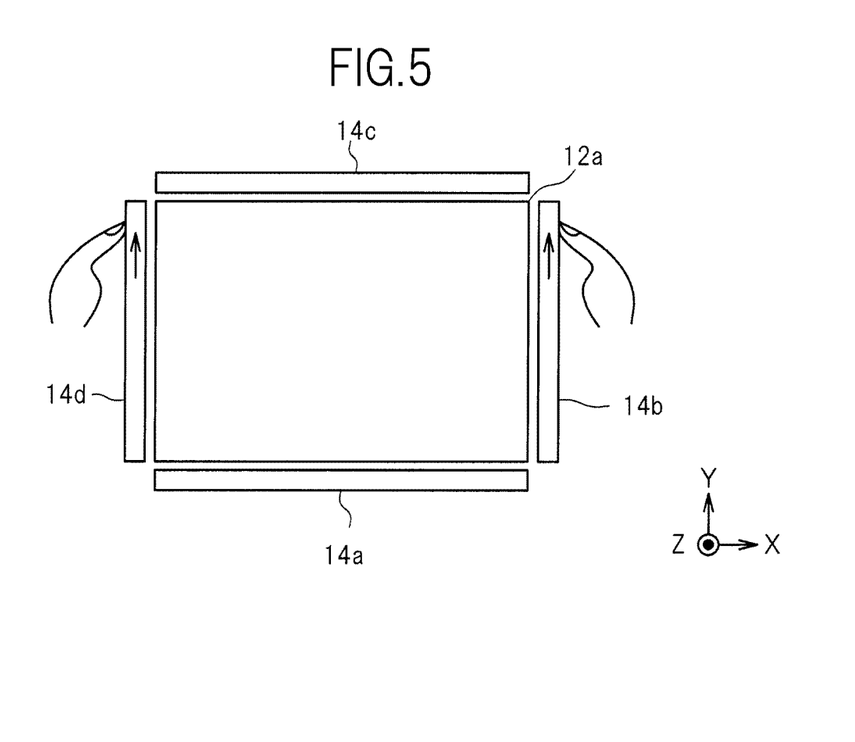
FIG. 5 An explanatory diagram illustrating another example of the operation performed by the user with respect to the touch sensors.

FIG. 5 illustrates an example in which the image displayed on the first display screen 12a is scrolled in the up-and-down direction. As illustrated in this figure, if the second touch sensor 14b and the fourth touch sensor 14d, which are arranged along the up-and-down direction of the display screen, both detect the movements of the fingers of the user moving in an upward direction (that is, positive Y-axis direction) when viewed facing the display screen, the control section 30 scrolls the image displayed on the first display screen 12a in the upward direction. Further, if the movements of the fingers of the user in a downward direction (that is, negative Y-axis direction) are detected, the control section 30 scrolls the display image in the downward direction.

Figure 6:
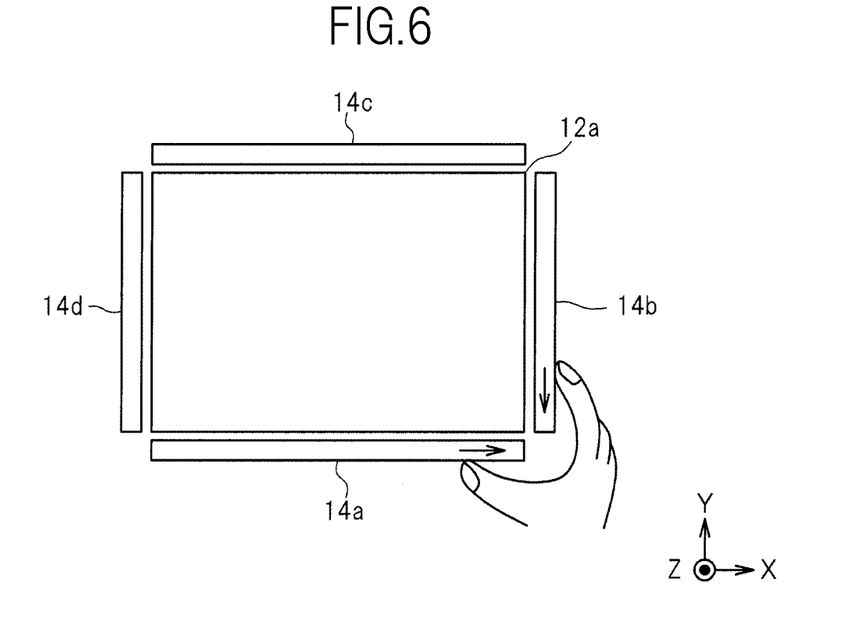
FIG. 6 An explanatory diagram illustrating another example of the operation performed by the user with respect to the touch sensors.

FIG. 6 illustrates an example in which the user gives an instruction for reduction of the image. In the example of this figure, the first touch sensor 14a detects the movement of the finger of the user in the positive X-axis direction, while the second touch sensor 14b detects the movement of the finger of the user in the negative Y-axis direction. That is, the two touch sensors adjacent to each other both detect the movements of the fingers of the user in the directions in which the finger approaches the other touch sensor. In this case, the control section 30 executes the processing for reducing the image displayed on the first display screen 12a. The reduction processing for the image may be similarly executed in a case where the second touch sensor 14b and the third touch sensor 14c detect the movements of the fingers of the user in the positive Y-axis direction and the positive X-axis direction, respectively, a case where the third touch sensor 14c and the fourth touch sensor 14d detect the movements of the fingers of the user in the negative X-axis direction and the positive Y-axis direction, respectively, and a case where the fourth touch sensor 14d and the first touch sensor 14a detect the movements of the fingers of the user in the negative Y-axis direction and the negative X-axis direction, respectively.

Figure 7:
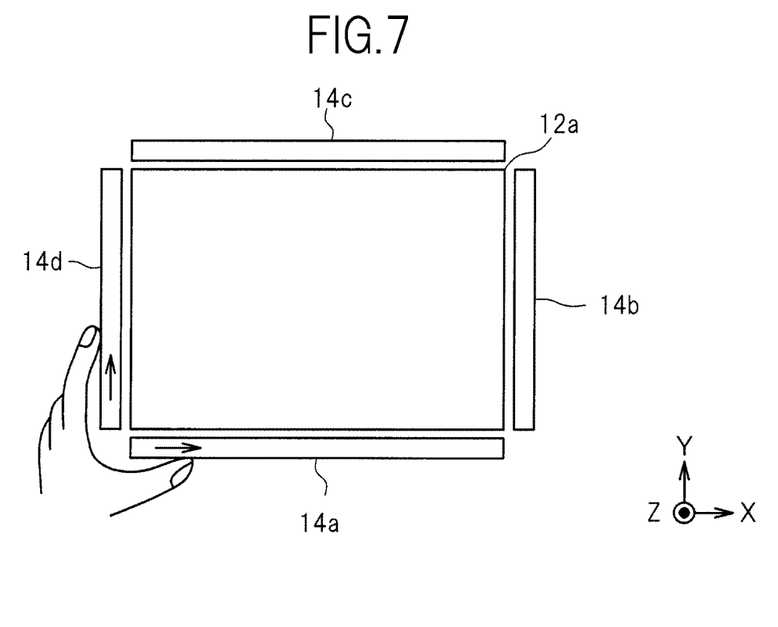
FIG. 7 An explanatory diagram illustrating another example of the operation performed by the user with respect to the touch sensors.

In contrast, if the two touch sensors adjacent to each other both detect the movements of the fingers of the user in the directions in which the finger moves away from the other touch sensor, the control section 30 executes the processing for enlarging the image displayed on the first display screen 12*a*. As an example of such a user's instruction to enlarge the image, FIG. 7 illustrates an example in which the fourth touch sensor 14*d* detects the movement of the finger of the user in the positive Y-axis direction and the first touch sensor 14*a* detects the movement of the finger of the user in the positive X-axis direction. If a combination of the movements of the fingers of the user in the directions reverse to the above-mentioned instruction to reduce the image is thus detected, the control section 30 executes the processing for enlarging the image displayed on the first display screen 12*a*.

Figure 8:
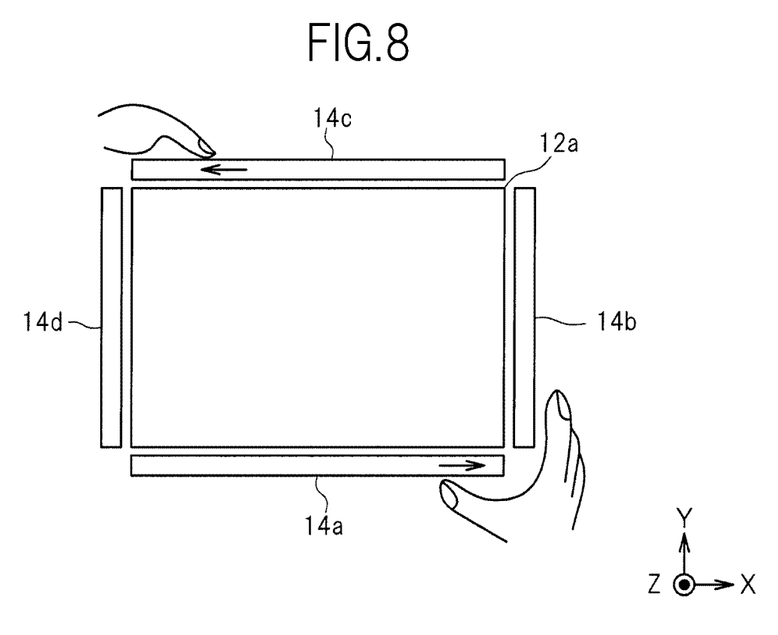
FIG. 8 An explanatory diagram illustrating another example of the operation performed by the user with respect to the touch sensors.
Figure 9:
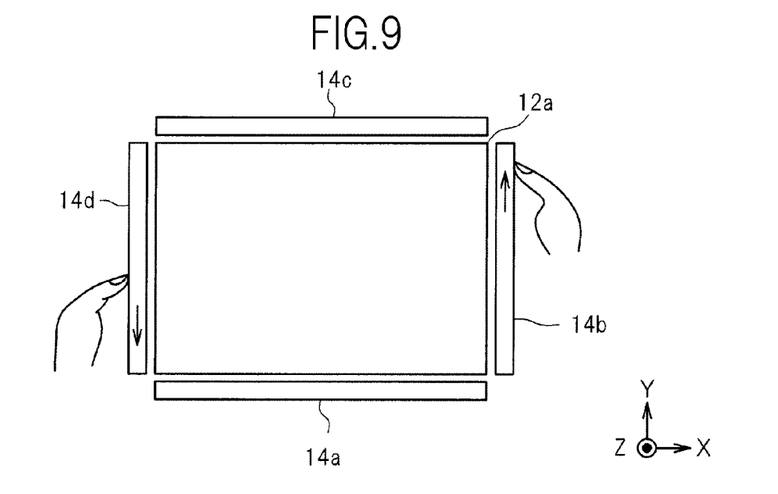
FIG. 9 An explanatory diagram illustrating another example of the operation performed by the user with respect to the touch sensors.

FIG. 8 and FIG. 9 illustrate examples of the movements of the fingers of the user exhibited when an instruction for rotation is performed. In the example of FIG. 8, the first touch sensor 14*a* and the third touch sensor 14*c* which are opposed to each other detect the movements of the fingers of the user which have directions opposite to each other. That is, the first touch sensor 14*a* and the third touch sensor 14*c* detect the movements of the fingers of the user in the positive X-axis direction and the negative X-axis direction, respectively. In accordance therewith, the control section 30 performs processing for rotating the image displayed on the first display screen 12*a* counterclockwise. Further, in contrast thereto, if the first touch sensor 14*a* and the third touch sensor 14*c* detect the movements of the fingers of the user in the negative X-axis direction and the positive X-axis direction, respectively, the control section 30 performs processing for rotating the display image clockwise.

Further, FIG. 9 illustrates an example in which the second touch sensor 14*b* and the fourth touch sensor 14*d* which are opposed to each other in the same manner detect the movements of the fingers of the user which have directions opposite to each other. In the example of this figure, the second touch sensor 14*b* and the fourth touch sensor 14*d* detect the movements of the fingers of the user in the positive Y-axis direction and the negative Y-axis direction, respectively, and in accordance therewith, the control section 30 rotates the display image counterclockwise. Alternatively, if the second touch sensor 14*b* and the fourth touch sensor 14*d* detect the movements of the fingers of the user in the negative Y-axis direction and the positive Y-axis direction, respectively, the control section 30 rotates the display image clockwise.

Note that, the first display screen 12*a* is assumed to be the main display screen in the above-mentioned examples, but, also in a case where the second display screen 12*b* is selected as the main display screen, the control section 30 may execute similar processing to thereby enable the user to perform an operation input for changing the image displayed on the display screen. However, in this case, the control section 30 changes a correlation between the moving direction of the position of the finger detected by each touch sensor and the scrolling direction or the rotation direction of the image in accordance with which display screen is selected as the main display screen or which orientation the image is displayed in with respect to the main display screen. Accordingly, it is possible to change the image in accordance with the direction in which the user has moved his/her finger.

Further, in the above-mentioned example, the control section 30 may change the image displayed on the first display screen 12*a* in accordance with not only the moving direction of the finger of the user detected by each touch sensor but also a movement amount thereof. For example, when the image is changed in accordance with the amount by which the finger of the user has moved, the following factors may be changed: a scroll amount; a scrolling speed; an enlargement ratio/reduction ratio; an enlargement/reduction speed; a rotation amount; and a rotational speed. In addition, in the above-mentioned examples, the control section 30 scrolls, enlarges/reduces, or rotates the entire image displayed on the main display screen. However, the embodiment of the present invention is not limited thereto, and the image displayed on the main display screen may be changed by executing processing for moving, enlarging/reducing, or rotating a part of the displayed image or an object to be operated which is located inside the image in accordance with the movement of the finger of the user.

Further, the description has been made so far of the examples of changing the display image in accordance with the combination of the movements of the respective positions of a plurality of fingers. However, the embodiment of the present invention is not limited thereto, and the control section 30 may execute various kinds of processing for changing the display image according to, for example, an operation in which the user simply touches a plurality of predetermined positions with the fingers.

Further, in the description made so far, the touch sensors 14*a* to 14*d* are each configured to detect only one position touched by the finger of the user. However, each of the touch sensors 14*a* to 14*d* may be able to perform multi-point detection for detecting respective positions of a plurality of fingers when touched by the plurality of fingers at the same time. In this case, the control section 30 may change the image displayed on the main display screen in accordance with the combination of the positions of the plurality of fingers which are detected by one touch sensor.

Specifically, in the case where the positions of the plurality of fingers are detected by the one touch sensor, the detection position/information acquisition section 40 acquires a plurality of coordinate values output by the touch sensor. Then, information including magnitudes of the acquired plurality of coordinate values (that is, order of positions within the detection region indicated by the respective coordinate values) and a distance from the previously-detected position of the finger is used to associate each of the acquired plurality of coordinate values with a coordinate value presumed to indicate the position having been touched by the same finger of the user among the coordinate values previously output by the touch sensor. Accordingly, based on the outputs of the one touch sensor, the detection position/information acquisition section 40 can acquire a plurality of coordinate value sequences indicating the respective movements of the plurality of fingers. The operation type determination section 42 determines the type of operation executed by the user by using the plurality of coordinate value sequences in the same manner as the plurality of coordinate value sequences acquired based on the coordinate values respectively output by the plurality of touch sensors in the above-mentioned examples.

Figure 10:
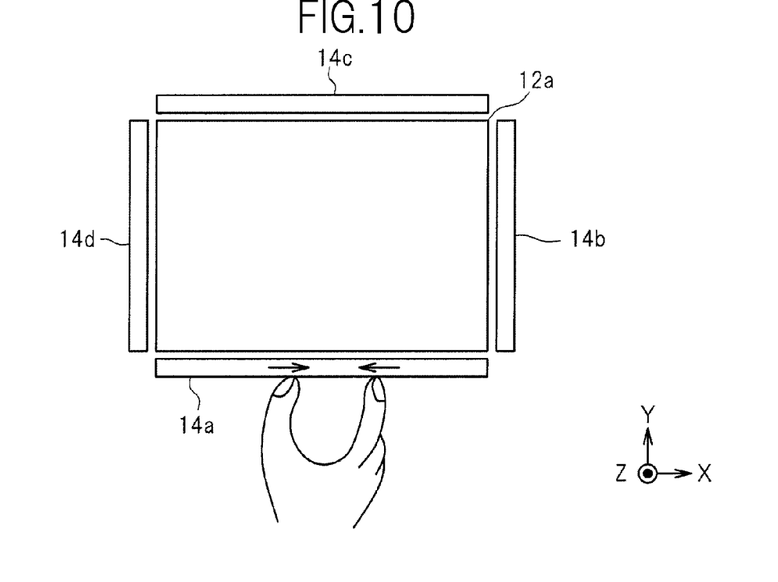
FIG. 10 An explanatory diagram illustrating another example of the operation performed by the user with respect to the touch sensors.

FIG. 10 illustrates an example of the movements of the fingers of the user detected by such a touch sensor of a multi-point detection type. In the example of this figure, the first touch sensor 14*a* detects movements in which two fingers of the user are approaching each other. In this case, in the same manner as in the example of FIG. 6, the display image control processing section 44 executes the processing for reducing the display image. Alternatively, if the movements in which the two fingers are moving away from each other are detected, the display image control processing section 44 executes the processing for enlarging the display image. Note that, not only the first touch sensor 14a but also the other three touch sensors may be configured to detect the same movements of the fingers of the user to thereby reduce or enlarge the display image.

Note that, in the case where the touch sensor is of the multi-point detection type, a plurality of coordinate value sequences in which a coordinate value sequence indicating that the position does not change coexists with a coordinate value sequence indicating that the position varies over time may be acquired in terms of the outputs from the respective touch sensors. In such a case, the operation type determination section 42 may be configured to determine that the coordinate value sequence indicating that the position does not change represents the position touched by a hand of the user because the user is holding the casing 10, and to exclude such a coordinate value sequence from targets of operation type determination. With this configuration, even if the touch sensor detects contact with a finger or a palm of the hand which is not intended by the user, the user's operation with respect to the plurality of touch sensors as exemplified in FIG. 4 to FIG. 9 can be identified by targeting only the operation in which the user moves his/her finger on the touch sensor.

Further, the control section 30 may be configured to execute various kinds of processing in accordance with the detected position of the finger of the user even if one touch sensor detects only the movement of one finger of the user. For example, if one of the touch sensors detects the movement of the finger of the user, the control section 30 may execute the processing for scrolling the display image to any one of the up/down/left/right in the same manner as in the above-mentioned examples of FIG. 4 and FIG. 5. Further, the control section 30 may execute various kinds of processing even if one touch sensor detects that the finger of the user has merely touched a predetermined position. As an example, in a case where the portable image display device 1 includes a camera device, the control section 30 may execute image pickup processing for an image performed by the camera device when it is detected that the user has depressed a position in which a general camera is provided with a shutter button with a pressure exceeding a predetermined intensity.

Described here is an example of processing executed by the operation type determination section 42 on the plurality of coordinate value sequences output by the detection position/ information acquisition section 40 in order to discriminate the actual movement of the finger of the user. Note that, in the following example, the touch sensors 14a to 14d are sensors of the multi-point detection type, and the detection position/ information acquisition section 40 can output a plurality of coordinate value sequences for the respective touch sensors.

First, the operation type determination section 42 executes low-pass filtering processing for passing only a frequency component equal to or lower than a predetermined cut-off frequency (for example, approximately 5 Hz) for each of the coordinate value sequences. Accordingly, a signal component having a relatively high frequency caused by hand movement or the like is removed from the coordinate value sequence indicating the detection position of the finger of the user.

Subsequently, the operation type determination section 42 sorts the plurality of coordinate value sequences, each of which has been subjected to the low-pass filtering processing, according to a predetermined reference. The order for the sorting is such an order as to assign a higher priority to a coordinate value obtained with a higher probability by the user touching the touch sensor with the finger with the intention to perform any operation input. Specifically, for example, the operation type determination section 42 calculates index values of the respective coordinate value sequences according to conditions as enumerated below, and sorts the coordinate value sequences in order of the calculated index values. As an example, the index value of the coordinate value sequence with which the pressure value detected along with the detection of each of the coordinate values forming the coordinate value sequence is larger is calculated to have a higher value. This lowers the priority assigned to the coordinate value sequence obtain by the user touching the touch sensor with the finger against the intention. Further, the index value of the coordinate value sequence with which the detection position indicated by the coordinate value sequence exists relatively in the same position with stability or exhibits a stable change toward one direction is calculated to have a higher value. That is, the index value of the coordinate value sequence exhibiting an extremely large change in position within a short time or the coordinate value sequence exhibiting repetitive changes in direction of the changing position within a short time, which may be generated due to erroneous detection or the like, is calculated to have a lower value. Further, the index value of the coordinate value sequence in which the detection position indicated by another coordinate value sequence does not exist in the vicinity of the detection position indicated by the own coordinate value sequence (that is, coordinate value sequence independent of the other) is calculated to have a higher value. With this configuration, in a case where detection positions indicated by a plurality of coordinate value sequences exist close to each other within a relatively narrow range, such coordinate value sequences are assumed to be obtained by the user holding the portable image display device 1, and hence the index values of such coordinate value sequences may be set to have lower values. Further, the number of coordinate values forming each coordinate value sequence (that is, period during which the finger of the user is continuously in contact) may be used for the calculation of the index value.

Further, the operation type determination section 42 performs determination of the type of operation performed by the user by evaluating the respective coordinate value sequences according to the order of the above-mentioned sorting and discriminating whether or not the respective coordinate value sequences correspond to a predetermined operation pattern. With this configuration, the determination of the operation type can be performed by preferentially setting the coordinate value sequence assumed to have been obtained by the user touching the touch sensor with the intention as the determination target. In this case, the order of precedence may be previously set for the operation types to be determined. That is, the portable image display device 1 previously stores a table in which a priority is associated with each of a plurality of operation patterns to be discriminated. Then, in order from the operation pattern assigned a higher priority, each of the plurality of operation patterns is subjected to the determination as to whether or not there is a coordinate value sequence corresponding to the operation pattern. In addition, the determination as to whether or not each of the coordinate value sequences corresponds to the operation pattern is performed in the order in which the above-mentioned sorting is performed for the respective coordinate value sequences. Specific examples of the order of the operation patterns include descending order of precedence such as the operation according to the movements of two or more fingers of the user, the operation according to the movement of one finger thereof, the operation in which one finger touches a predetermined position, and the operation in which one finger moves away from a predetermined position. As a result of performing the determination of the operation type in this order, the first operation pattern for which the coordinate value sequence corresponding thereto is determined to exist is determined as the operation input actually performed by the user. With this configuration, the operation that is more unlikely to be erroneously detected can be detected preferentially as the user's operation. Further, in a case where the operation according to the movements of two or more fingers, the operation according to the movement of one finger, and the like have a plurality of kinds, the order of precedence among those plurality of kinds of operation patterns may be set. Further, this order of precedence may be changed according to the contents of processing being executed by an application program. With this configuration, the priorities assigned to the operation that is more unlikely to be executed by the user and the operation to be avoided from being erroneously determined (such as an operation for finally deciding the processing contents) can be lowered according to the contents (state) of the processing being executed.

Note that, when the determination as to whether or not each of the coordinate value sequences corresponds to the operation pattern is performed by the operation type determination section 42, the detection position changing by an amount exceeding a given amount of backlash may be added to the conditions for the determination as to whether or not to correspond to the operation pattern. This can avoid the determination that the operation in which the user moves his/her finger on the touch sensor in a predetermined direction has been performed in a case where the user slightly touches the touch sensor with the finger against the intention of the user and other such cases. Note that, the amount of backlash may have mutually different values for the types of the plurality of operation patterns. For example, the amount of backlash may be changed between such an operation pattern with respect to touch sensors apart from each other as exemplified in FIG. 5 and such an operation pattern with respect to touch sensors adjacent to each other as exemplified in FIG. 6.

According to this embodiment described above, the image displayed on the display screen is changed in accordance with the combination of the positions of the fingers respectively detected by the plurality of touch sensors provided along the circumference of the display screen. With this configuration, by touching the positions on a plurality of touch sensors corresponding to the display screen with the fingers, the user can perform an operation input with respect to the image displayed on the display screen with ease in a mode that facilitates an intuitive understanding. Further, by detecting the positions of a plurality of fingers through the plurality of touch sensors and changing the image in accordance with the combination thereof, the portable image display device 1 according to this embodiment can receive many different types of operation inputs performed by the user. In addition, the plurality of touch sensors are provided along the circumference of the display screen, and hence the display screen is not hidden by fingers when the user touches and operates those touch sensors with the fingers, which can hardly impair a viewing characteristic of the screen.

The embodiment of the present invention is not limited to the above-mentioned embodiment.

Figure 11:
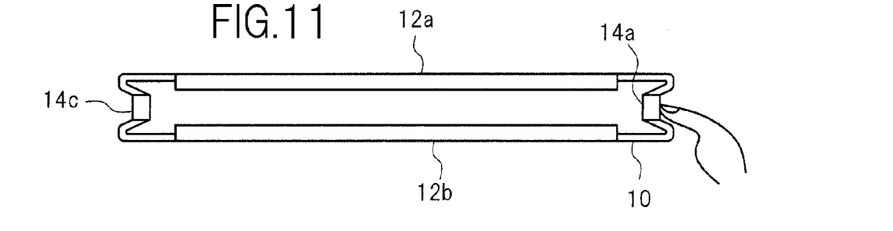
FIG. 11 A diagram illustrating a sectional shape of another portable image display device according to the embodiments of the present invention.

For example, in a case of providing a touch sensor to each of the side surfaces of the casing 10 of the portable image display device 1, the side surfaces of the casing may be formed so as to have a concave shape when viewed from the directions parallel with both the front surface to which the display screen is provided and the side surface, and touch sensors may be arranged in a straight-line shape along bottom surfaces of the concave portions thus formed. FIG. 11 illustrates a sectional shape of a portable image display device whose side surfaces are formed to have a concave shape in such a manner. Note that, the portable image display device illustrated in this figure has the same structure as the portable image display device illustrated in FIG. 1A and FIG. 1B except that the side surfaces are formed to have a concave shape, and has the respective display screens and touch sensors are arranged in the same manner. Further, FIG. 11 illustrates a state in which the portable image display device 1 is cut along a plane which is perpendicular to the respective display screens and passes through the first touch sensor 14a and the third touch sensor 14c. If the touch sensors are thus arranged along the bottom surfaces of the concave portions, as illustrated in the figure, the user can touch the touch sensor with the finger when intending to touch the touch sensor, while the finger or the palm of the hand of the user can be prevented from touching the touch sensor against the intention of the user in a portion of the casing by which the user is simply holding.

Further, in the example described above, the respective touch sensors are provided to the side surfaces of the casing 10. However, the touch sensors may be provided to the same plane as the respective display screens of the casing so as to be adjacent to the respective sides defining the circumference of the display screen. Further, the touch sensors are not necessarily provided along all the four sides defining the rectangular circumference. As long as two touch sensors are provided along at least two sides such as one long side and one short side, the control section 30 changes the image displayed on the display screen in accordance with the combination of the positions of the fingers of the user detected by those respective touch sensors, thereby allowing the user to intuitively perform various operations such as enlargement or reduction on the display screen.

Second Embodiment

Next, a portable image display device according to a second embodiment of the present invention is described. Note that, a hardware configuration of the portable image display device according to the second embodiment is the same as the hardware configuration of the portable image display device according to the first embodiment illustrated in FIG. 1A, FIG. 1B, and FIG. 2. Therefore, detailed description thereof is omitted, and the same components as those of the first embodiment are referenced by using the same reference symbols.

In this embodiment, the control section 30 executes various kinds of processing based on the detection results obtained respectively through the touch sensors 14a to 14d, the far-infrared sensors 16a and 16b, the acceleration sensor 18, and the gyroscope 20 and other such information, and displays the results of the processing on the first display screen 12a or the second display screen 12b. For example, the control section 30 may execute a plurality of programs, and may display two kinds of images generated by those respective programs on the first display screen 12a and the second display screen 12b. Alternatively, a main image and a sub image generated by one program may be displayed on the first display screen 12a and the second display screen 12b. By occasionally turning upside down the casing 10 of the portable image display device 1, the user uses the portable image display device 1 while viewing the first display screen 12a at one time and viewing the second display screen 12b at another time.

Figure 12:
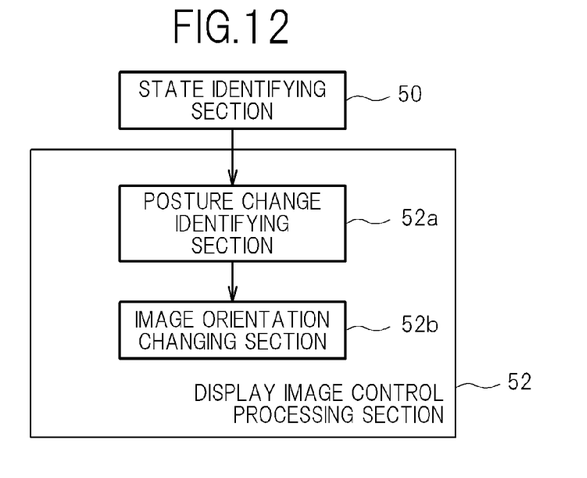
FIG. 12 A functional block diagram illustrating a functional example of a portable image display device according to a second embodiment.

Hereinafter, a specific example of the processing executed by the control section 30 in this embodiment is described. In this embodiment, the control section 30 identifies each of a state in which the first display screen 12a is directed to the user (hereinafter, referred to as "first state") and a state in which the second display screen 12b is directed to the user (hereinafter, referred to as "second state"). Then, the control section 30 executes the processing for changing the image displayed on the display screen directed to the user in accordance with a mode of a posture change of the casing 10 obtained when a transition occurs between the two states. In order to execute such processing, as illustrated in FIG. 12, the portable image display device 1 functionally includes a state identifying section 50 and a display image control processing section 52. Further, in this embodiment, the display image control processing section 52 functionally includes a posture change identifying section 52a and an image orientation changing section 52b. Those functions are implemented by the control section 30 executing a program stored in the storage section 32. The program may be provided by being stored in any kind of computer-readable information storage medium such as an optical disk or a memory card, or may be provided via a communication network such as the Internet.

The state identifying section 50 identifies each of the first state and the second state based on the detection results and the like obtained through the respective sensors. As a specific example, the state identifying section 50 identifies the first state and the second state according to the detection results obtained through the first far-infrared sensor 16a and the second far-infrared sensor 16b. That is, the first state in which the first display screen 12a located on the same surface of the casing 10 as that of the first far-infrared sensor 16a is directed to the user is determined in a case where the first far-infrared sensor 16a has detected the existence of user, and the second state in which the second display screen 12b is directed to the user is determined in a case where the second far-infrared sensor 16b has detected the existence of user.

The display image control processing section 52 performs control of changing the image displayed on one or both of the first display screen 12a and the second display screen 12b in accordance with the mode of the posture change of the casing 10 obtained when a transition occurs in the state identified by the state identifying section 50.

Specifically, the posture change identifying section 52a first identifies the mode of the posture change of the casing 10 obtained when a transition occurs from one of the first state and the second state to the other. That is, it is identified which of a first pattern and a second pattern that are previously defined corresponds to a process of change in the posture of the casing 10 obtained when a transition occurs from one state to the other state.

As an example, when the casing 10 is rotated and a transition occurs from one state to the other state, the posture change identifying 52a identifies the direction of a rotational axis of the rotation in terms of the casing 10. For example, when the user who has been viewing the first display screen 12a so far intends to view the second display screen 12b on the opposite side thereto, the user causes the casing 10 of the portable image display device 1 to rotate in any one of directions by 90 degrees or larger. At this time, the state identifying section 50 identifies the occurrence of the transition from the first state to the second state. The acceleration sensor 18 detects the posture of the casing 10 in the process during which the rotation is performed, and based on the detection results, the posture change identifying section 52a identifies which of the first pattern and the second pattern corresponds to the process of the posture change. For example, the posture change identifying section 52a determines that a case where the casing 10 is rotated about the Y-axis as the rotational axis corresponds to the first pattern, and determines that a case where the casing 10 is rotated about the X-axis as the rotational axis corresponds to the second pattern.

Figure 13A:
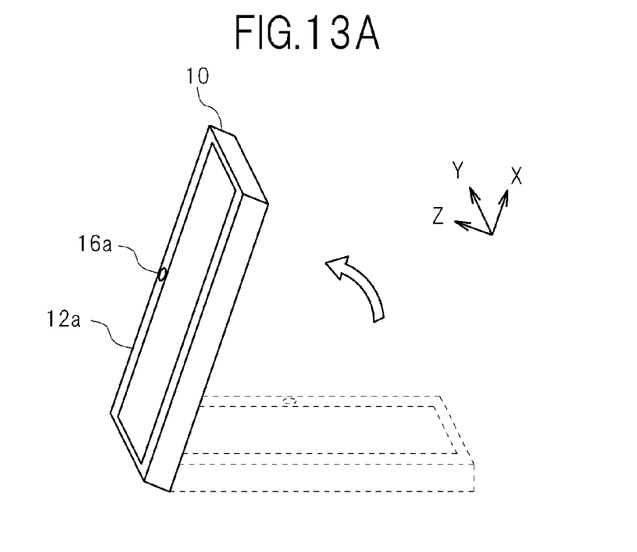
FIG. 13A An explanatory diagram illustrating an example of a mode of a posture change during a state transition.
Figure 13B:
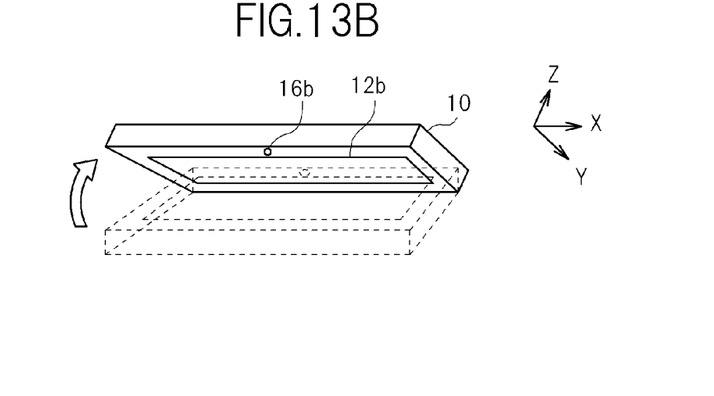
FIG. 13B An explanatory diagram illustrating another example of the mode of the posture change during the state transition.

FIG. 13A and FIG. 13B are diagrams illustrating the states of the posture changes of the first pattern and the second pattern as described above, and both illustrate the process during which a transition is made from the state (first state) in which the first display screen 12a is directed to the user to the state (second state) in which the second display screen 12b is directed to the user. FIG. 13A illustrates an example of the first pattern, in which the casing 10 is rotated about the Y-axis as the center. As a result, if the casing 10 is rotated by 180 degrees, the positive/negative directions of the X-axis and the Z-axis that are set in the casing 10 are reversed, but the positive/negative direction of the Y-axis is not changed. Further, FIG. 13B illustrates an example of the second pattern, in which the casing 10 is rotated about the X-axis as the center. As a result, if the casing 10 is rotated by 180 degrees, the positive/negative directions of the Y-axis and the Z-axis are reversed, but the positive/negative direction of the X-axis is not changed.

The posture change identifying section 52a can discriminate a difference between such posture changes as described above in accordance with respective acceleration values in terms of the X-axis direction and the Y-axis direction which are detected by the acceleration sensor 18 during the process of a state transition. That is, in the case where the casing 10 is rotated about the Y-axis as the rotational axis, the acceleration whose absolute value is near, equal to, or larger than a gravitational acceleration G is detected in terms of the X-axis direction in the middle of the rotation. Meanwhile, such a large acceleration is not detected in terms of the Y-axis direction. In contrast, in the case where the casing 10 is rotated about the X-axis as the rotational axis, a relatively large acceleration is detected in terms of the Y-axis direction in the middle of the rotation, and only a relatively small acceleration is detected in terms of the X-axis direction. Therefore, for example, during the state transition, the mode of the posture change of the casing 10 can be identified by determining as the rotational axis the axis exhibiting a smaller one of maximum values of the absolute values of the accelerations detected respectively in terms of the X-axis direction and the Y-axis direction.

Note that, in the case where the user changes the posture of the casing 10, the casing 10 is not necessarily caused to rotate about strictly one of the X-axis and the Y-axis. However, similarly in this case, the axis exhibiting the smaller maximum value may be regarded as the rotational axis by comparing the magnitudes between the maximum values of the absolute values of the accelerations in terms of the X-axis and the Y-axis.

According to the mode of the posture change at a time of the state transition identified by the posture change identifying section 52a, the image orientation changing section 52b changes the orientation of the image displayed on the display screen directed to the user with respect to the casing 10 in the state after the transition. That is, when the transition from the first state to the second state is identified by the state identifying section 50, the image orientation changing section 52b changes the orientation of the image displayed on the second display screen 12b after the transition to the second state in accordance with which of the first pattern and the second pattern has been determined for the process of the posture change by the posture change identifying section 52a.

As a specific example, in a case where the image has been displayed on the first display screen 12a in an orientation with the positive Y-axis direction pointing up and the positive X-axis direction pointing right when viewed from the user, the user is presumed to view the image displayed on the second display screen 12b in the same orientation even after the transition to the second state. Therefore, in a case where the state transition has been made in the first pattern (that is, case where the user has caused the casing 10 to rotate about the Y-axis as the rotational axis), the image orientation changing section 52b is configured to display the image on the second display screen 12b in an orientation with the positive Y-axis direction pointing up and the negative X-axis direction pointing right. Meanwhile, in a case where the state transition has been made in the second pattern (that is, case where the user has caused the casing 10 to rotate about the X-axis as the rotational axis), the image is displayed on the second display screen 12b in an orientation with the negative Y-axis direction pointing up and the positive X-axis direction pointing right. This is realized by vertically reversing the orientation of the image from the first pattern.

Figure 14:
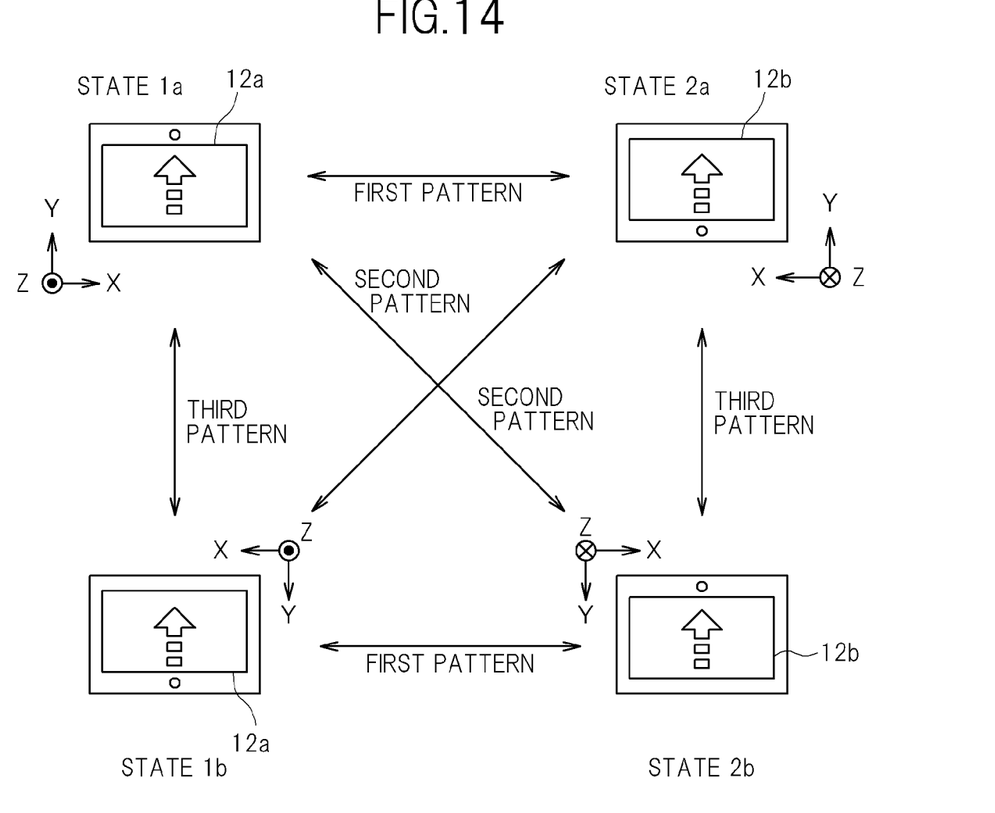
FIG. 14 An explanatory diagram illustrating a relationship between a transition between respective states and an orientation of a display image.

FIG. 14 is an explanatory diagram illustrating a relationship between the transition between such states and the orientation of the display image. Note that, by such control of the orientation of the image as described above, the portable image display device 1 may display the image in two kinds of orientations, that is, the orientation with the positive Y-axis direction pointing up and the orientation with the negative Y-axis direction pointing up, in each of the first state and the second state. Therefore, in the example of this figure, the first state includes a state represented as "1a state" in which the image is displayed in the orientation with the positive Y-axis direction pointing up when viewed from the user. Further, a state in which the image is displayed in the orientation with the negative Y-axis direction pointing up when viewed from the user is represented as "1b state". Similarly, the second state includes a state represented as "2a state" in which the image is displayed in the orientation with the positive Y-axis direction pointing up when viewed from the user and a state represented as "2b state" in which the image is displayed in the orientation with the negative Y-axis direction pointing up when viewed from the user. Note that, the broken line arrow within each display screen in the figure indicates the upper side of the image when the orientation of the image is changed by the image orientation changing section 52b.

As illustrated in FIG. 14, if there is a posture change of the first pattern in the 1a state, the portable image display device 1 shifts to the 2a state. In contrast, if there is a posture change of the second pattern, the portable image display device 1 shifts to the 2b state. Further, if there is a posture change of the first pattern in the 1b state, the portable image display device 1 shifts to the 2b state, and if there is a posture change of the second pattern, shifts to the 2a state. In addition, similarly to this, from the 2a state and the 2b state, the portable image display device 1 shifts to any one of the 1a state and the 1b state due to a posture change of the first pattern or the second pattern, in response to which the image orientation changing section 52b changes the orientation of the image displayed on the first display screen 12a. In such a manner, the orientation of the image to be displayed on the display screen directed to the user after the state transition is decided based on the orientation of the image displayed on the display image directed to the user before the state transition and the mode of the posture change of the casing 10 at the time of the state transition. By thus changing the orientation of the display image with respect to the casing 10, the portable image display device 1 can display the images so as to have the same orientation with respect to the user on both the first display screen 12a and the second display screen 12b no matter how the orientation of the casing 10 is changed.

Note that, as illustrated in FIG. 14, the image orientation changing section 52b may be configured to vertically reverse the orientation of the image displayed on the first display screen 12a (or second display screen 12b) even if there is a posture change of a third pattern in which the casing 10 is rotated about the Z-axis as the rotational axis by 180 degrees while maintaining the first state (or second state). Such a posture change is detected by using the gyroscope 20. Note that, in this case, for example, the user selects which of the orientations of the 1a state and the 1b state the image is to be displayed in at such a timing as a time to start using the portable image display device 1. After the selection is thus made, by executing such control of changing the orientation of the image with respect to the casing 10 as described above in accordance with the posture change of the casing 10, the portable image display device 1 can display image in the same orientation as the initially-selected orientation when viewed from the user.

In the description made so far, the orientation of the image displayed on the display screen directed to the user after the state transition is changed in accordance with the mode of the posture change at the time of the state transition. However, the display image control processing section 52 may change not only the orientation of the image but also the contents of the image to be displayed in accordance with the mode of the posture change at the time of the state transition. Further, the image displayed on the display screen directed to the user before the transition may be changed in accordance with the mode of the posture change at the time of the state transition when the transition occurs. Hereinafter, an example is described of a pattern in which the display image control processing section 52 changes the images displayed on both the first display screen 12a and the second display screen 12b when the state transition occurs. Note that, the case where a transition occurs from the first state to the second state is described as an example here, but the same processing may be performed in the reverse case.

In this example, the display image control processing section 52 identifies that the casing 10 has started rotation by using a detection result obtained through the acceleration sensor 18 before the state transition is completed. Then, the display image control processing section 52 predicts which pattern of the first pattern and the second pattern that are described above the state transition is to occur in, if the rotation is continued. Specifically, for example, the display image control processing section 52 predicts that, in a stage in which the absolute value of the output from the acceleration sensor 18 with respect to the X-axis exceeds a predetermined value, the rotation made about the Y-axis as the rotational axis occurs and the state transition of the first pattern may occur. Further, the display image control processing section 52 predicts that, in a stage in which the absolute value of the output from the acceleration sensor 18 with respect to the Y-axis exceeds a predetermined value, the rotation made about the X-axis as the rotational axis occurs and the state transition of the second pattern may occur.

Based on the prediction result, the display image control processing section 52 changes the image displayed on the first display screen 12a so as to scroll toward a predetermined direction. The scrolling direction in this case changes in accordance with the mode of the predicted posture change. In addition, the display image control processing section 52 may change the image displayed on the display screen in accordance with not only the direction of the rotational axis but also the direction of the rotation made about the rotational axis as the center. For example, the display image control processing section 52 may change the scrolling direction of the image in accordance with which direction the rotation occurs in.

As a specific example, as illustrated in FIG. 13A, if the casing 10 is rotated about the Y-axis as the rotational axis counterclockwise when viewed toward the positive Y-axis direction, it is detected that an acceleration due to gravity occurs in the negative X-axis direction. Therefore, as the acceleration with respect to the negative X-axis direction increases, the display image control processing section 52 scrolls the image displayed on the first display screen 12a in the positive X-axis direction. Further, the image displayed on the second display screen 12b is gradually scrolled from outside the screen toward the negative X-axis direction (that is, reverse direction to the scrolling direction of the image displayed on the first display screen 12a), and is controlled so that the image is displayed with the center in a screen central portion at a point in time when the transition to the second state is finally completed and when the acceleration in the X-axis direction returns to a value equal to or smaller than a predetermined value. In contrast, if the casing 10 is rotated about the Y-axis as the rotational axis clockwise when viewed toward the positive Y-axis direction, the image displayed on the first display screen 12a is scrolled in the negative X-axis direction, and the image displayed on the second display screen 12b is scrolled in the positive X-axis direction. Further, as illustrated in FIG. 13B, if the casing 10 is rotated about the X-axis as the rotational axis counterclockwise when viewed toward the positive X-axis direction, the image displayed on the first display screen 12a is scrolled toward the negative Y-axis direction in accordance with the rotation, and the image displayed on the second display screen 12b is scrolled toward the positive Y-axis direction, thereby controlling so that the image is displayed in the screen central portion of the second display screen 12b at the point in time when the state transition is finally completed. In contrast, if the casing 10 is rotated about the X-axis as the rotational axis clockwise when viewed toward the positive X-axis direction, the image displayed on the first display screen 12a is scrolled in the positive Y-axis direction, and the image displayed on the second display screen 12b is scrolled in the negative Y-axis direction. Such changes of the display image produce visual effects that look as if the image were moving continuously from the first display screen 12a to the second display screen 12b from the user's viewpoint. Even in the case of performing such control, in the same manner as in the above-mentioned example, the orientation of the image displayed on the second display screen 12b may be changed in accordance with the direction of the rotational axis of the casing 10.

Note that, it may be decided in accordance with the kind of the image displayed on each display screen whether or not such processing for changing the image is executed at the time of the state transition. For example, in a case where images generated by the same program are displayed on the first display screen 12a and the second display screen 12b, the control for changing the images may be executed at the time of the state transition, while in a case where images generated by different programs are displayed on the respective display screens, the orientation of the image displayed on the display screen directed to the user after the state transition may be simply changed in accordance with the mode of the posture change at the time of the state transition as described above. Further, the display image control processing section 52 not only scrolls the images displayed on the respective display screens but also may change the images so as to produce various visual effects in accordance with state transitions. For example, the display image control processing section 52 may execute such display control for the image as to reduce the image displayed on the display screen directed to the user before the state transition as the state transition progresses, while enlarging the image displayed on the display screen directed to the user after the state transition, starting from a predetermined size, as the state transition progresses.

According to this embodiment described above, the image displayed on the display screen directed to the user is changed in accordance with the mode of the posture change of the casing 10 at the time of the state transition. Accordingly, it is possible to present the user with the image in accordance with the mode that corresponds to how the user handles the portable image display device 1. Specifically, for example, the orientation of the image displayed on the display screen directed to the user with respect to the casing 10 after the state transition is changed in accordance with the mode of the posture change of the casing 10 at the time of the state transition, and hence the user can view the images displayed on both the first display screen 12a and the second display screen 12b in the same orientation even if the orientation of the portable image display device 1 is changed in a different mode.

Note that, the embodiment of the present invention is not limited to the ones described above. For example, in the above description, the first state and the second state are identified by using the detection results obtained through the far-infrared sensors, but the present invention is not limited thereto, and the state identifying section 50 may identify those states by using the detection results and the like obtained through the other sensors. Specifically, the state identifying section 50 may identify the first state and the second state based on the detection result obtained through the acceleration sensor 18. In this case, for example, the user is assumed to view the display screen in a substantially vertical direction from above. That is, if the acceleration sensor 18 detects that a gravitational acceleration occurs in the negative Z-axis direction, it is determined that the first display screen 12a provided in the positive Z-axis direction is directed to the user, while if a gravitational acceleration occurs in the positive Z-axis direction, it is determined that the second display screen 12b provided in the negative Z-axis direction is directed to the user. Accordingly, it is possible to identify the first state and the second state even if there is no device such as a far-infrared sensor that can directly detect the user.

Further, the description has been made so far of the example of identifying the mode of the posture change only based on the output from the acceleration sensor 18, but the posture change identifying section 52a may identify the mode of the posture change of the casing 10 by using, for example, a detection result output from another device such as the gyroscope 20 that can detect the posture of the casing 10. In this case, even in a case where the state transition occurs not only by the rotation made merely about the rotational axis but also through a more complicated process of the posture change, the portable image display device 1 can identify the mode of the posture change.

The invention claimed is:

1. A portable image display device, comprising:
a display screen having a substantially rectangular shape;
a plurality of touch sensors provided along at least two sides defining a circumference of the display screen, wherein each of the touch sensors is configured to detect a position touched by a finger of a user; and
a control section for changing an image displayed on the display screen in accordance with a combination of the positions of a plurality of the fingers which are respectively detected by the plurality of touch sensors;
wherein the control section acquires one or more coordinate value sequences, which include coordinate values indicating the positions detected at predetermined time intervals, from each of the plurality of touch sensors;

wherein the control section calculates an index value for each of the one or more coordinate value sequences, wherein each index value indicates a probability that its corresponding coordinate value sequence is generated by an operation input of the user; and wherein the control section determines whether or not each of the one or more coordinate value sequences corresponds to a predetermined operation pattern based at least in part on the calculated index values.

2. The portable image display device according to claim 1, wherein the control section changes the image displayed on the display screen in accordance with a combination of movements of the respective positions of the plurality of the fingers which are detected by the plurality of touch sensors.

3. The portable image display device according to claim 2, wherein the control section changes the image displayed on the display screen in accordance with a combination of directions of the movements of the respective positions of the plurality of the fingers which are detected by the plurality of touch sensors.

4. The portable image display device according to claim 1, further comprising a plate-like casing having a substantially rectangular shape, wherein:
   the display screen is provided to a front surface of the plate-like casing; and
   each of the plurality of touch sensors is provided to a side surface of the plate-like casing.

5. A control method for a portable image display device comprising:
   displaying an image on a display screen having a substantially rectangular shape;
   detecting a position touched by a finger of a user by each of a plurality of touch sensors provided along at least two sides defining a circumference of the display screen;
   changing the image displayed on the display screen in accordance with a combination of the positions of a plurality of the fingers which are respectively detected by the plurality of touch sensors;
   acquiring one or more coordinate value sequences, which include coordinate values indicating the positions detected at predetermined time intervals, from each of the plurality of touch sensors;
   calculating an index value for each of the one or more coordinate value sequences, wherein each index value indicates a probability that its corresponding coordinate value sequence is generated by an operation input of the user; and
   determining whether or not each of the one or more coordinate value sequences corresponds to a predetermined operation pattern based at least in part on the calculated index values.

6. A non-transitory computer-readable information storage medium, which stores a program for controlling a computer to function as a portable image display device, the program adapted to cause the computer to execute steps comprising:
   displaying an image on a display screen having a substantially rectangular shape;
   detecting a position touched by a finger of a user by each of a plurality of touch sensors provided along at least two sides defining a circumference of the display screen;
   changing the image displayed on the display screen in accordance with a combination of the positions of a plurality of the fingers which are respectively detected by the plurality of touch sensors;
   acquiring one or more coordinate value sequences, which include coordinate values indicating the positions detected at predetermined time intervals, from each of the plurality of touch sensors;
   calculating an index value for each of the one or more coordinate value sequences, wherein each index value indicates a probability that its corresponding coordinate value sequence is generated by an operation input of the user; and
   determining whether or not each of the one or more coordinate value sequences corresponds to a predetermined operation pattern based at least in part on the calculated index values.

* * * * *